Patented Oct. 19, 1937

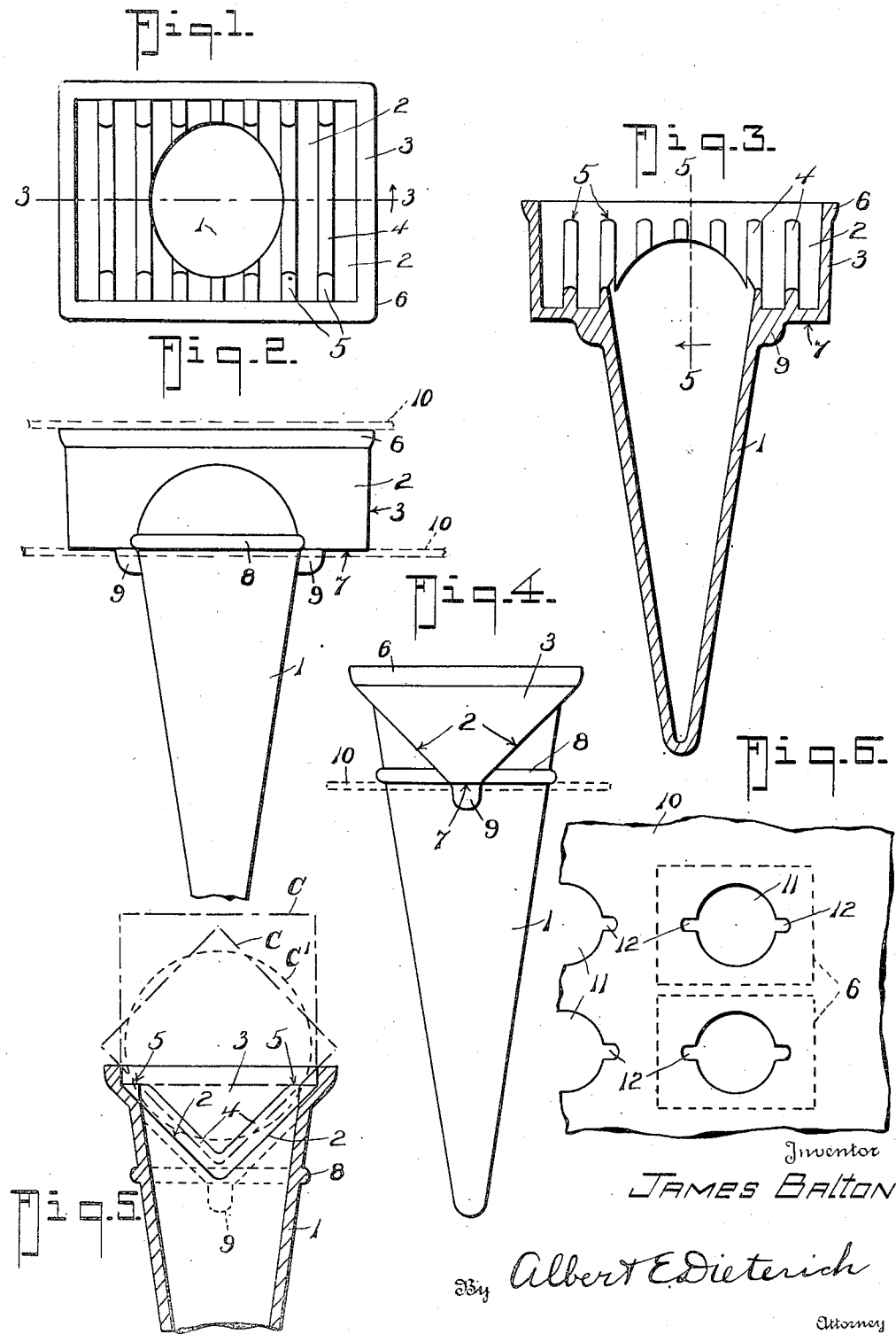

2,096,532

UNITED STATES PATENT OFFICE 2,096,532

ICE CREAM CONE

James Balton, Baltimore, Md., assignor of one-fourth to Joseph Shapiro, Baltimore, Md., one-fourth to Isaac Shapiro, Chicago, Ill., one-fourth to Nathan Shapiro, Chelsea, Mass., and one-fourth to Samuel Shapiro, Chelsea, Mass.

Application December 7, 1934, Serial No. 756,550

7 Claims. (Cl. 99—89)

My invention relates to certain new and useful improvements in ice cream cones and it primarily has for its object to provide a cone to hold a rectangular block of ice cream. Plans are being made by some ice cream concerns for serving ice cream in cones without dipping. The serious objection to the dipping method of filling ice cream cones is that not enough ice cream is dipped from a gallon. The number of cones that can be served from a gallon of ice cream by the dipping method depends mainly on the skill of the one who is dispensing the ice cream.

Where the ice cream is put up in rectangular blocks dipping is unnecessary. In order to take care of such blocks of ice cream and hold them either sidewise or edgewise, as may be desired, I have devised the cone herein shown and described.

Furthermore, the present invention has for an object to provide an improved cone of the type shown in my application for Letters Patent filed June 22, 1934, Serial No. 731,993, and to that end the invention provides a cone with means for supporting it on a partition sheet or spacer in nested relation to the cone below when packed for shipment, means being provided to hold the cones against swiveling or turning on their axes while nested and packed for shipment.

Again, it is an object to provide a large area of supporting surface between the cone and the partition sheet or spacer whereby the weight of the upper cones will be distributed over the entire mouth edges of the cones beneath when packed for shipment.

Again, it is an object to provide a cone of the type stated with reinforcing and ice cream holding ribs so as to take a rectangular block of ice cream either edgewise or flat-wise, or to take a cylinder of ice cream lying down, as may be desired.

Other objects will in part be obvious and in part be pointed out hereinafter.

To the attainment of the aforesaid objects and ends, the invention still further resides in those novel details of construction, combination and arrangement of parts, all of which will be first fully described in the following detailed description, then be pointed out in the appended claims, reference being had to the accompanying drawing, in which:

Figure 1 is a top plan view of a cone embodying my invention.

Figure 2 is a side elevation of the same.

Figure 3 is a vertical longitudinal section on the line 3—3 of Figure 1.

Figure 4 is an end elevation of the cone.

Figure 5 is a detail vertical cross section on the line 5—5 of Figure 3.

Figure 6 is a plan of a portion of a partition sheet or spacer, two cones being indicated by dotted lines in the drawing.

In the drawing, in which like numerals and letters of reference indicate like parts in all the figures, 1 represents the stem of the cone which is of the usual conical form. At the upper end of the stem there is constructed a laterally elongated bowl comprising front and back sides or walls 2—2 inclined at right angles to one another, and ends 3.

Molded within the bowl and lying in parallel planes transversely of the bowl are reinforcing and cream holding ribs 4, the upper edges 5 of which lie in a horizontal plane a predetermined distance below the plane containing the upper or outer edge of the bead 6 at the mouth of the cone so as to present shoulder-like portions on which a block of ice cream of rectangular form may be set flat, as indicated by dot and dash lines C, or the same may be set edgewise, as indicated by other dot and dash lines C, in Figure 5. In either event, however, the cream when inserted into the bowl will receive the ribs 4 which become embedded in the cream block and hold it against falling out while the cone is being eaten.

Where the downwardly converging or tapered sides 2 meet at the bottom the edge is flattened off somewhat as at 7 to form shoulders that rest on the partition sheet 10 (see dotted lines, Figures 2 and 4). In order to steady the cone and give a larger resting surface, the cone is provided with a nesting ring 8, the lower surface of which lies in the same plane as that containing the surface 7 so that when the cone is inserted in the aperture 11 of the sheet 10 the ring 8 will rest throughout on the sheet 10 and the cone will be additionally supported by the surface 7 resting on the sheet 10.

In order to prevent the cones swiveling on their axes when inserted in the partition sheet 10, the cones are provided with lugs 9, preferably located beneath the shoulders 7 and adjacent the stem 1.

The cones must be kept from swiveling in order that they may not touch each other during shipment and thereby become broken.

While the cone has been especially designed to support a rectangular block of ice cream, it is obvious that a cylindrical block of ice cream may be supported thereby if desired, as the ribs 4 will sink into the cylindrical block, if used, to hold it in place. (See dash lines C' in Figure 5.)

From the foregoing description, taken in connection with the accompanying drawing, it is thought that the construction and advantages of the invention will be clear to those skilled in the art.

What I claim is:

1. An ice cream cone comprising a stem and a laterally elongated bowl at the top of the stem, said bowl having front and back walls inclined downwardly and toward one another and having end walls to receive a rectangular block of ice cream with one face of the block parallel to and adjacent the front wall and an adjacent face of the block parallel to and adjacent the back wall, and transverse ribs on the front and back walls within the bowl, the longitudinal edges of the ribs on a wall lying in a plane parallel to that wall, the tops of the ribs lying in a plane parallel to and substantially below the outer edge of the cone.

2. An ice cream cone comprising a stem and a laterally elongated bowl at the top of the stem, said bowl having front and back walls inclined downwardly and toward one another and having end walls to receive a square block of ice cream with one face of the block parallel to and adjacent the front wall and an adjacent face of the block parallel to and adjacent the back wall, and transverse ribs on the front and back walls within the bowl, the longitudinal edges of the ribs on a wall lying in a plane parallel to that wall said ribs terminating below the mouth edge of the cone and having their upper ends located in a plane paralleling the plane which contains the outer edge of the mouth of the cone, and below the same, the width of the bowl being greater than the width of the faces of the block of ice cream.

3. An ice cream cone comprising a stem and a laterally elongated bowl at the top of the stem, said bowl having front and back walls inclined downwardly and toward one another and having end walls to receive a rectangular block of ice cream with one face of the block parallel to and adjacent the front wall and an adjacent face of the block parallel to and adjacent the back wall, and transverse ribs on the front and back walls within the bowl, said cone having flattened portions where the downwardly inclined walls meet on which the cone may rest when nested in a partition sheet, and swivel-preventing lugs formed adjacent the stem and said flattened portions and projecting below said flattened portions.

4. An ice cream cone comprising a stem and a laterally elongated bowl at the top of the stem, said bowl having front and back walls inclined downwardly and toward one another and having end walls to receive a rectangular block of ice cream with one face of the block parallel to and adjacent the front wall and an adjacent face of the block parallel to and adjacent the back wall, and transverse ribs on the front and back walls within the bowl, said cone having flattened portions where the downwardly inclined walls meet on which the cone may rest when nested in a partition sheet, and a nesting ring around the stem with its lower surface located in the same plane as that containing said flattened portions.

5. An ice cream cone comprising a stem and a laterally elongated bowl at the top of the stem, said bowl having front and back walls inclined downwardly and toward one another and having end walls to receive a rectangular block of ice cream with one face of the block parallel to and adjacent the front wall and an adjacent face of the block parallel to and adjacent the back wall, and transverse ribs on the front and back walls within the bowl, said ribs terminating below the mouth edge of the cone and having their upper ends located in a plane paralleling the plane which contains the outer edge of the mouth of the cone, said cone having flattened portions where the downwardly inclined walls meet on which the cone may rest when nested in a partition sheet, and a nesting ring around the stem with its lower surface located in the same plane as that containing said flattened portions.

6. An ice cream cone comprising a stem and a laterally elongated bowl at the top of the stem, said bowl having front and back walls inclined downwardly and toward one another and having end walls to receive a rectangular block of ice cream with one face of the block parallel to and adjacent the front wall and an adjacent face of the block parallel to and adjacent the back wall, transverse ribs on the front and back walls within the bowl, said cone having flattened portions where the downwardly inclined walls meet on which the cone may rest when nested in a partition sheet, swivel-preventing lugs formed adjacent the stem and said flattened portions, and a nesting ring around the stem with its lower surface located in the same plane as that containing said flattened portions.

7. An ice cream cone comprising a hollow stem of conical form and a bowl laterally elongated at each side of the stem, said bowl having its front and back walls inclined downwardly and inwardly to make a right angle with one another, said bowl including end walls, and a nesting ring on said stem cooperating with the lower meeting edge of the front and back walls to support the cone when nested, said nesting ring having its lower surface located in the same plane as that of said meeting edge whereby the cone will be supported on a partition sheet by both the nesting ring and said meeting edge, and swivel-preventing lugs radiating from the stem adjacent said ring and said meeting edge and projecting below the same.

JAMES BALTON.